May 21, 1957     J. A. ADLOFF     2,793,048
INDEPENDENT FRONT WHEEL SUSPENSION
Filed Dec. 10, 1953

Inventor
Jakob August Adloff
By
A. E. Jones
Attorney

United States Patent Office 2,793,048
Patented May 21, 1957

2,793,048

INDEPENDENT FRONT WHEEL SUSPENSION

Jakob August Adloff, Mainz-Gonsenheim, Germany, assignor to General Motors Corporation, Detroit, Mich., a corporation of Delaware Application December 10, 1953, Serial No. 397,387

2 Claims. (Cl. 280—96.2)

The invention relates to independent suspensions for the front steering wheels of motor vehicles and more particularly to suspensions having arrangements for adjusting the chamber and the positive or negative castor of wheels whose guide links are arranged one above the other and articulated to an axle support or to the vehicle body or frame.

With such a construction, it has hitherto been necessary to adjust the camber and the positive or negative castor at different places. This necessitates a number of lengthy operations which may be a troublesome factor in continuous production on a large scale. Furthermore, the bearings of the links are complicated and expensive and the wear on the adjusting devices is excessive, with the result that frequent readjustments become necessary.

In order to overcome these defects, the object of the invention is to adjust the camber and the positive or negative castor simultaneously in one operation at a single place.

A further object of the invention is to provide for the adjustment in the bearing member of one of the arms of tht steering knuckle, and advantageously in the lower link.

The invention is defined in the appended claims; and how it can be carried into effect is hereinafter particularly described with reference to the accompanying drawing, in which:

Figure 1:
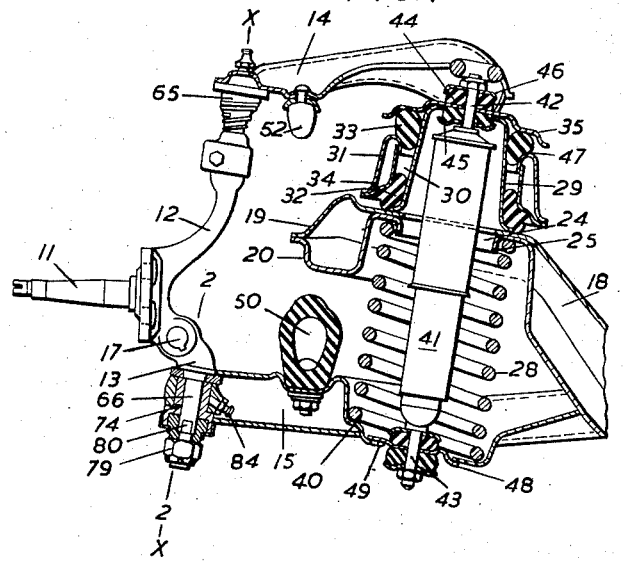
Fig. 1 is a front elevation, partly in section, of a wheel suspension according to the invention.

As shown in Figure 1, the stub axle 11 is made in one piece, for example as a forging, with the steering knuckle which has a long upwardly directed arm 12 and a short downwardly directed arm 13 and is pivotally mounted about a substantially vertical axis X—X at the outer extremities of the upper and lower guide links 15 and 14. Due to the fact that the steering kunckle and stub axle are in one piece pivotable about the axis X—X, the usual steering kunckle support and king pin can be dispensed with, the arrangement permitting a simple attachment of the track lever of the steering linkage (not shown) in a bore 17 in the arm 13.

The lower guide link 15 is articulated to a frame cross member 18 consisting of two sheet-metal pressings 19 and 20 which are welded together at their edges to form a box girder of great strength and torsional stiffness. At each end the upper and lower webs 19 and 20 of the cross member 18 are apertured at 24 and the lower web is pressed inwardly to abut the upper web and is bent to form an upper abutment for an unguided helical spring 28 with a downwardly bent edge 25.

A cup-shaped bracket 29 is welded on to the cross member 18 above the apertures 24. The cross member 18 is secured to frame side-members 31 by passing the brackets 29 from below through apertures 30 in the side-members 31, which are of box-shaped cross-section and are enlarged in the region of the apertures 30.

An annular rubber cushion 32 is interposed between a shoulder 34 around the lower mouth of the aperture 30 and the bracket 29.

A second annular rubber cushion 33 is disposed between the upper mouth of the aperture 30 and a plate 35 attached to the bracket 29.

The lower guide link 15 has a portion formed as a flat trough 40 to act as a bottom abutment for the helical spring 28, inside which is a telescopic shock absorber 41 secured at its upper extremity to the bracket 29 and at its lower extremity to the trough 40.

The shock absorber has at each end a threaded pin 42 and 43 respectively, passing through holes in the bracket and trough. At each end of the shock absorber the threaded pin carries an upper and a lower rubber cushion 44 and 45, these cushions being arranged between holding plates 46 and 47. At the lower end of the shock absorber 41, a plate 48 is gripped between the two rubber cushions by a nut on the pin 43 and closes the hole 49 in the trough 40 of the guide link 15, being secured to the base of the trough 40 by bolts (not shown).

At the upper end, the plate 35 attached to the bracket 29 is gripped between the two rubber cushions 44 and 45 by a nut on the pin 42.

A rubber bumper 50 for limiting relative upward movement of the wheel is bolted to the lower guide link 15 and a smaller rubber bumper 52 on the upper link 14 limits relative downward movement.

The upper link 14 is connected to the upper end of the arm 12 by a ball joint 65.

Figure 2:
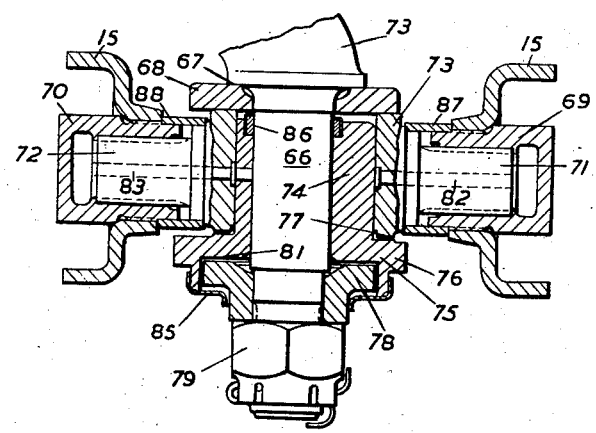
Fig. 2 is a section on the line 2—2 of Fig. 1.

The lower end of the arm 13 is machined to form an integral pin 66 having a shoulder 67 against which a washer 68 rests (Fig. 2). Mounted in aligned longitudinally disposed holes at the outer ends of each link 15 are nuts 69 and 70 in which are threaded bolts 71, 72 integral with a central hub 73. The hub 73 has a substantially vertical bore within which is an eccentrically bored adjustment bush 74 into which the pin 66 is fitted. At its lower end, the bush 74 has a hexagonal head 75, so that it may be turned by means of a suitable wrench. The lower edge 77 of the hub 73 engages the hexagonal head 75 which engages a collar 78 keyed on the pin 66 by flat portions 80. The end of the pin 66 is screw threaded to receive a castle nut 79, which can be tightened to grip the hub 63 between the washer 68 and the hexagonal head 75.

The bottom edge 77 of the hub 73 and the opposed face of the hexagonal head 75 are serrated or knurled, so as to lock the parts against relative rotation.

Lubricating channels 82 and 83 are connected to a lubricating nipple 84 (Fig. 1) and packings 85, 86, 87 and 88 are provided to prevent the penetration of dirt.

Adjustment of camber and castor is effected as follows:

An assembled front axle unit comprising the cross-member 18 and the sprung parts, is placed in a suitable rig, in which it can be loaded so that the range of forces applied corresponds to the conditions which arise in a finished car in the loaded and unloaded conditions. Variations which arise under load, for example, elastic deformations of the links or of the steering knuckle guide system, or manufacturing inaccuracies in the wheel suspension, can be taken into account during the adjustment of the camber and positive and negative castor.

Camber and castor are adjusted by turning the eccentric bush 74 so that the axis X—X moves over the envelope surface of a cone whose apex lies at the midpoint of the ball joint 65.

The camber and the positive or negative castor are thereby adjusted simultaneously and in dependence upon each other until they lie within their predetermined tolerances.

Tests have shown that this system of adjustment can be used in all cases and gives good results.

In order to enable the adjustment to be done rapidly and correctly during continuous factory production, measuring instruments can be used with feelers to contact the steering knuckle and indicate e. g. by visual signals when the correct adjustment is attained. After correct adjustment the castle nut 79 is tightened up and locked by a split pin.

The invention provides a front steering wheel suspension in which the adjustment of castor and camber can be carried out rapidly and correctly in a particularly economical manner.

While but a single embodiment has been shown and described herein, it is clear that the invention is subject to modification and change and that it is not intended to limit the invention to the one embodiment shown but only to the scope of the claims which follow.

I claim:

1. In a spring suspension for a front dirigibly mounted vehicle ground wheel, the combination of a vehicle frame, a steering knuckle having upwardly and downwardly directed arms, an upper transverse guide link connected at its outer end to said upwardly directed knuckle arm by a ball joint and pivotally connected at its inner end to said frame, a lower transverse guide link having at its inner end a pivotal connection to said frame and at its outer end a pivotal connection to said knuckle, adjustment means for the simultaneous adjustment of camber and castor at said last-mentioned pivotal connection comprising an adjustable eccentrically-bored bush for said downwardly directed knuckle arm mounted in a pivotal member on said lower link, a serrated lower face on said bush, a collar having an upper serrated face and mounted non-rotatably for axial movement on said downwardly directed knuckle arm and screw and nut means for tightening said serrated faces into non-rotational engagement.

2. In a vehicle, a vehicle frame, a front dirigible road wheel and an independent suspension for said wheel comprising an integral stub axle and steering knuckle having upwardly and downwardly directed arms, spaced upper and lower transverse guide links pivotally connected at their inner ends to said frame, said upper guide link being connected to said upwardly directed knuckle arm by a ball joint and said lower guide link being connected to said downwardly directed knuckle arm by an adjustable eccentrically bored bush for said downwardly directed arm mounted in a pivotal member on said lower link to provide simultaneous castor and camber adjustment, said bush including a serrated lower face, a collar having an upper serrated face and mounted non-rotatably for axial movement on said downwardly directed knuckle arm and screw and nut means for tightening said serrated faces into non-rotational engagement.

References Cited in the file of this patent

UNITED STATES PATENTS

| | | |
|---|---|---|
| 2,045,210 | Wagner | June 23, 1936 |
| 2,115,919 | Slack | May 3, 1938 |
| 2,405,458 | Slack et al. | Aug. 6, 1946 |
| 2,455,343 | Slack et al. | Nov. 30, 1948 |
| 2,507,108 | Lange | May 9, 1950 |
| 2,611,625 | Kishline et al. | Sept. 23, 1952 |
| 2,664,297 | Booth | Dec. 29, 1953 |

FOREIGN PATENTS

| | | |
|---|---|---|
| 645,627 | Great Britain | Nov. 1, 1950 |